US012792760B1

(12) United States Patent
Singh et al.

(10) Patent No.: US 12,792,760 B1
(45) Date of Patent: Nov. 10, 2026

(54) ENHANCED DATA SECURITY FOR PERSONALLY IDENTIFIABLE INFORMATION

(71) Applicant: Amazon Technologies, Inc., Seattle, WA (US)

(72) Inventors: Bijendra Singh, Cedar Park, TX (US); Toby Sedgwick, Cedar Park, TX (US); Mirang Kenia, Woodinville, WA (US); Shruti Kothari, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 18/966,913

(22) Filed: Dec. 3, 2024

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
USPC ........................................................... 726/26
See application file for complete search history.

(56) References Cited

U.S. PATENT DOCUMENTS

| | | | | |
|---|---|---|---|---|
| 9,602,480 | B2 * | 3/2017 | Yan | G06F 21/62 |
| 11,716,357 | B2 * | 8/2023 | Vahlis | G06F 16/122 |
| 2013/0340093 | A1 * | 12/2013 | Reinertsen | G06F 21/109<br>726/28 |
| 2018/0239959 | A1 * | 8/2018 | Bui | G06Q 10/103 |
| 2022/0164465 | A1 * | 5/2022 | Prettejohn | G06F 21/604 |

* cited by examiner

*Primary Examiner* — Dant B Shaifer Harriman
(74) *Attorney, Agent, or Firm* — Eversheds Sutherland (US) LLP

(57) ABSTRACT

Devices, systems, and methods for enhancing data privacy in a distributed architecture using data purposes includes receiving, by at least one processor of a requester system, a data access request to a data owner for first data for a first purpose, wherein the data access request includes an indication of the first data; accessing, by at least one processor of the data owner or by the at least one processor of the requester system, a global purpose table defining permitted purposes for respective nodes and for respective types of data access requests; and permitting or denying, by the at least one processor of the data owner or of the requester system, the data access request based on whether the global purpose table indicates that the first purpose is a permitted purpose for a target node of the data access request.

20 Claims, 10 Drawing Sheets

Global Purpose Table 306

| Node-ID | READ | GET | STORE |
|---|---|---|---|
| Sr | Pd1, Pd2, Pd5, Pd8 | Pd1, Pd2 | Pd1, Pd2 |
| A1 | Pa1, Pa2, Pa3 | Pa1 | Pa1 |
| N1 | - | - | - |
| N2 | - | - | - |
| N3 | - | - | - |
| .. | - | - | - |
| Sd | Pd3, Pd5, Pd8, Pd9 | Pd3, Pd5, Pd8, Pd9 | Pd3, Pd5, Pd8, Pd9 |

ENHANCED DATA SECURITY FOR PERSONALLY IDENTIFIABLE INFORMATION

BACKGROUND

In domains that handle sensitive data, it may be required to have definitive knowledge of where the types of data are stored. When an organization serves a large number of users or offers a variety of services, the data gathering and storage systems have complex and distributed architecture that make it difficult to understand and maintain knowledge of the data storage. When data storage system architecture becomes complex, it becomes more difficult to understand all the services and storages where data types are being stored.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
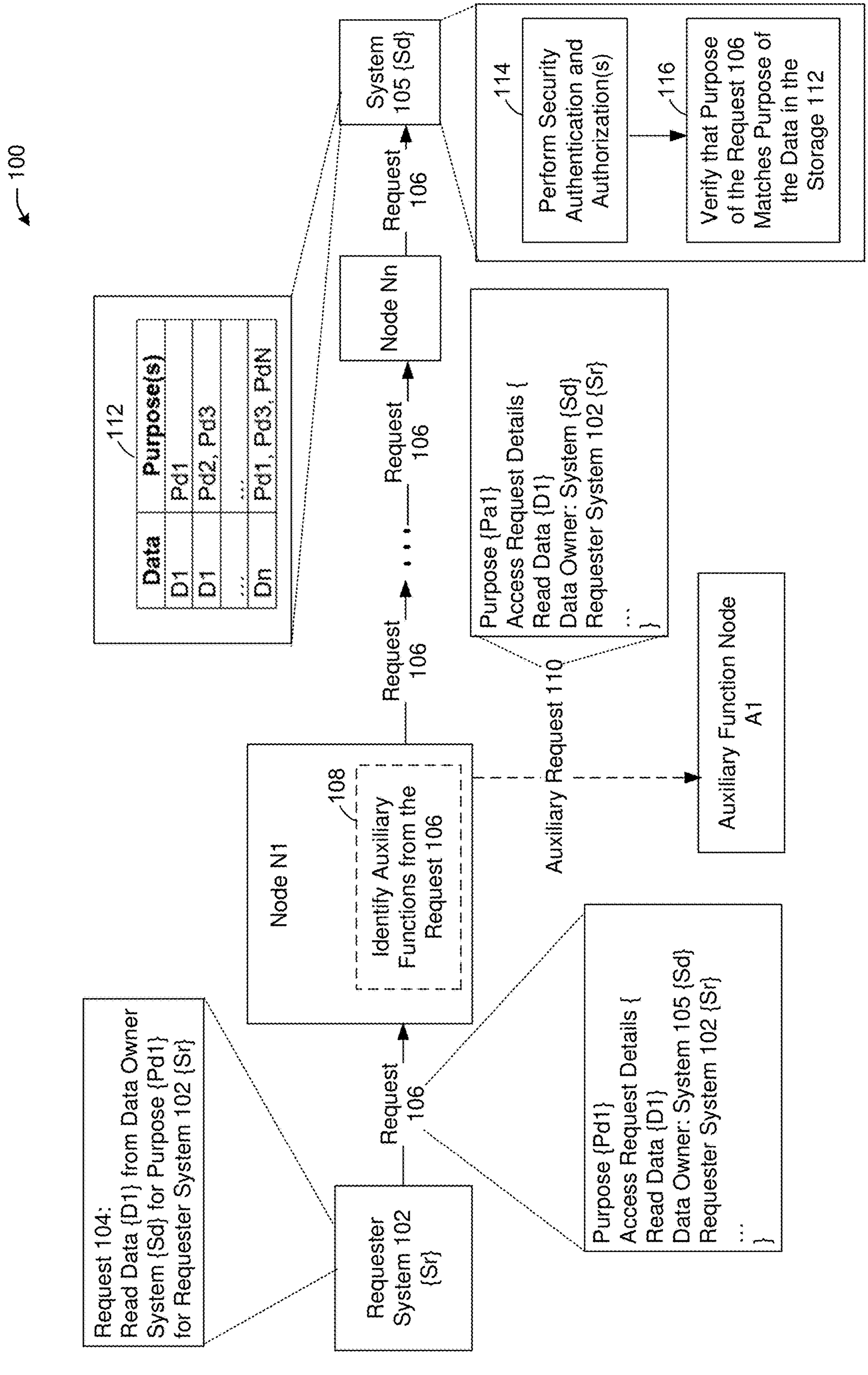
FIG. 1 is an example data access call progression, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced data security protection of personally identifiable information (PII).

Larger and more complex data storage system architectures often are subject to data privacy regulations. For example, some regulations may require that any data gathered for a person of a younger age may be handled strictly. It is more difficult to know the data services and storages in large data storage architectures, and therefore difficult to ensure data privacy and compliance with data privacy regulations.

The present disclosure solves data privacy challenges for complex architectures by providing a flexible and effective data storage mechanism, and by providing a way of knowing what type of data is stored in which locations in a system architecture. Personal data, for example, may not be sent to a node that is not permitted to handle the data, and writing of data that does not match permitted data storage purposes for a node may be prohibited to ensure data privacy.

In one or more embodiments, the present disclosure uses a concept of data purpose, which defines the reason or rationale for accessing or storing a specific data element. Access or storage reasons need to make sense and be legally permissible based on applicable privacy compliance laws. If an assigned data access or storage purpose does not match a request for data access or storage, then the request is denied. There can be a variety of purposes associated with any data element. A new purpose may be associated with a data element or an already associated purpose may be disassociated from a data element (e.g., data purposes are not static for any given data element). The possible purposes may be globally known types within a data access domain for uniformity of applicability of data access. For example, the possible purposes may be stored in one or more tables accessible to various computer system resources.

In one or more embodiments, a requester system may send READ, GET, and STORE data access requests for data elements either part of or not already a part of a data schema of the data owner. The target node for the data access requests (e.g., the requester for a READ or GET request, or the data owner for a STORE request) needs to be permitted to perform the intended purpose of the request for the given data element. When the data owner does not already include the requested data in its schema, the data access request may be denied, although storage types such as data lakes may process requests for new data elements. When the target node is not permitted to perform the requested purpose, or when the requested purpose is not permitted for the requested data, the data access request may be denied. When the requested data is available in the data owner's schema, and when the requested purpose is permitted for the target node and the requested data, the data access request may be granted.

In one or more embodiments, examples of data purposes may include providing products and services, recommendations and personalization, advertising, fraud, risk and security, legal rights and obligations, age verifications, troubleshooting and improvement services, and the like. Data purposes may belong to a number of categories. For example, data access or storage purposes may be used for controlling access to PII data, and may be well-known across a data access domain: Data access and storage purposes={$P_{d1}$, $P_{d2}$, . . . , $P_{dN}$}. Auxiliary purposes may refer to support purposes that may help complete intermediate validations so that the primary purpose of data access may be achieved. For example, to complete a user action, the user's account may need to be accessed (e.g., a data access purpose). The complete the action, it may be required to perform a fraud check, which would be an auxiliary purpose: Auxiliary purposes={$P_{a1}$, $P_{a2}$, . . . , $P_{aN}$}. Measurement purposes may refer to purposes for performing system and/or technical measurements. For example, when completing a user task, a service may perform a technical check for a measurement purpose: Measurement purposes={$P_{m1}$, $P_{m2}$, . . . , $P_{mN}$}. These are merely exemplarity purposes, and other data purposes may be used similarly. The nodes of a system may include data aware and data unaware nodes, starting with the requester system $S_r$ and ending with the system data owner $S_d$, and also including auxiliary nodes, for example: {$S_r$, A1, N1, N2, N3, . . . , Nn, $S_d$}. A system requester node may permit only reading of data elements that include certain purposes. For data elements assigned certain purposes, a GET operation may be permitted. For data elements assigned certain purposes, a STORE operation may be permitted. The system data owner node may permit READ, GET, and STORE operations for data assigned certain purposes.

In one or more embodiments, data access or storage requests originate from a requester system and start with one or more data access or storage purposes. A data access or storage request may traverse a chain of intermediate nodes before it reaches a node/system that holds the data or a node/system where the data is to be written or stored. Auxiliary and measurement purposes may be associated with a data access or storage purpose during a data call in the middle of a call path. At the end of a call when a request has reached a target system where either the requested data needs to be accessed or stored, only the originally purpose may be used to make the final request access check. An auxiliary or measurement purpose may only use the original data access purpose if needed to complete the auxiliary purpose, and this may occur recursively.

In one or more embodiments, data access purpose types may include a READ purpose, a GET purpose, and a STORE purpose. A node may be assigned a READ purpose to allow reading of specific data elements from it, but only enables the data for a local operation; a READ purpose does not permit GETTING a copy of the data back to the caller. A node may be assigned a GET purpose to return a copy of the data back to the caller, which is equivalent to an HTTP GET request. A node assigned a STORE purpose may permit storage of the data on its data stores. All data that does not match an assigned STORE purpose may not be allowed to be stored on the node. A STORE purpose may represent a combination of HTTP POST/PUT/PATCH/DELETE requests.

In an example of the embodiments herein, a data requester system $S_r$ may originate a data request to read data D1 from a data owner system $S_d$ for the purpose $P_{d1}$ for the requester system. The data access request generated by the requester system may provide the purpose $P_{d1}$, and access request details such as "Read Data {D1}, Data Owner: System {$S_d$}, Requester System {$S_r$}" and the like. A node N1 may receive and examine the request, and may learn that it needs to perform auxiliary functions before forwarding the request. The node N1 may make a request to auxiliary functionality node A1, including the purpose $P_{d1}$, and access request details such as "Read Data {D1}, Data Owner: System {$S_d$}, Requester System {$S_r$}" and the like. The node N1 may propagate the data access request to another node N2, which may serve as a passthrough node. The node N2 may propagate the data access request to the System {$S_d$}, which may be the data owner system and target node that owns the data D1. The node N2 verifies whether the data access request purpose $P_{d1}$ matches the data purpose for the data D1 in its storage. The node N2 may store or have access to a table defining the data purpose(s) for respective data, so the node N2 may identify the data purpose(s) for the data D1 and verify whether the data access request purpose $P_{d1}$ matches the data purpose for the data D1. When the purposes match, the access is granted, otherwise the requested access is denied.

In one or more embodiments, any of the nodes, including the data owner, may have access to at least a portion of a global purpose table defining data access purpose types (e.g., Read, Get, Store) that respective nodes are permitted to perform. Additional purpose tables may define which purposes are permitted for respective data elements. Some nodes may be data aware, and some nodes may be data unaware. Data unaware nodes do not examine the request data content, and therefore may not fall under data privacy compliance requirements. Data aware nodes examine the request data content, and may be permitted to perform READ, GET, and/or STORE operations with assigned purposes for respective data. In this manner, some data aware nodes may use at a least a portion of the global purpose table for the operations that the nodes may be permitted to perform.

The enhanced techniques herein ensure that only authorized and known data stores have access to some personal information by allowing reading of specific data elements to nodes that have allowed purposes. Data is not sent to nodes that do not have any purpose receiving that data. In this manner, a requester node is denied retrieval of a copy of data because it does not have a permitted purpose for locally storing the data, for example. A data sending node may verify whether the destination node is capable of handling data for a specific purpose. When the answer is no, the data is not even sent to the target node for storage. The enhanced techniques herein eliminate issues where data lakes or other storage become locations where personal information is sent without being able to detect privacy compliance obligations and risks, as the data storage only store data whose purpose has been approved.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 is an example data access call progression 100, in accordance with one or more embodiments of the present disclosure.

Referring to FIG. 1, a requester system 102 {Sr} may receive a request 104 to read data {D1} (e.g., a READ request) from a data owner system 105 {Sd} for purpose {Pd1} for the requester system 102 {Sr}. The request 104 may result in a generated data access request 106 sent to a node N1. The data access request 106 may include the purpose {Pd1} and access request details {Read: Data {D1}, Data Owner: system 105 {Sd}, and requester system 102 {Sr}}. The node N1 may be a data aware node, which optionally may, at block 108, examine the data access request 106 and determine that the node N1 needs to perform auxiliary functions before forwarding the data access request 106 to a next node. Therefore, the node N1 may make an auxiliary request 110 to an auxiliary function node A1. The auxiliary request 110 may include: Purpose {Pa1} and access request details {Read: Data {D1} Data owner: system 105 {Sd}, requester system 102 {Sr}}. After the auxiliary functions are performed in response to the auxiliary request 110, the node N1 may propagate the data access request 106 to one or more subsequent nodes (e.g., Node Nn). In the example of FIG. 1, node Nn may be a passthrough node (e.g., a data unaware node), and may propagate the data access request 106 to the system {Sd} 105.

Still referring to FIG. 1, the system {Sd} 105, and any of the nodes, may have access to a purpose table 112 defining one or more permitted purposes for given data. The data owner system 105 {Sd} is the target node that owns the data {D1}. The data owner system 105 {Sd} examines the data access request 106 and, at block 114, performs security authentication and/or authorizations to ensure that the requester system 102 {Sr} is authorized to read the requested data {D1}. At block 116, the data owner system 105 {Sd} may verify that the purpose of the data access request 106 matches the data purpose in its storage. If yes, the access is granted, otherwise the request is denied. In the example data access request 106, and the request type is READ, the request purpose is {Pd1}. According the purpose table 112, the data {D1} is permitted for purpose {Pd1}, which matches the data access request 106, so the data access request 106 is granted by the data owner system 105 {Sd}, and the requester system 102 {Sr} may read the data {D1} from the data owner system 105 {Sd} for the purpose {Pd1}.

Figure 3:
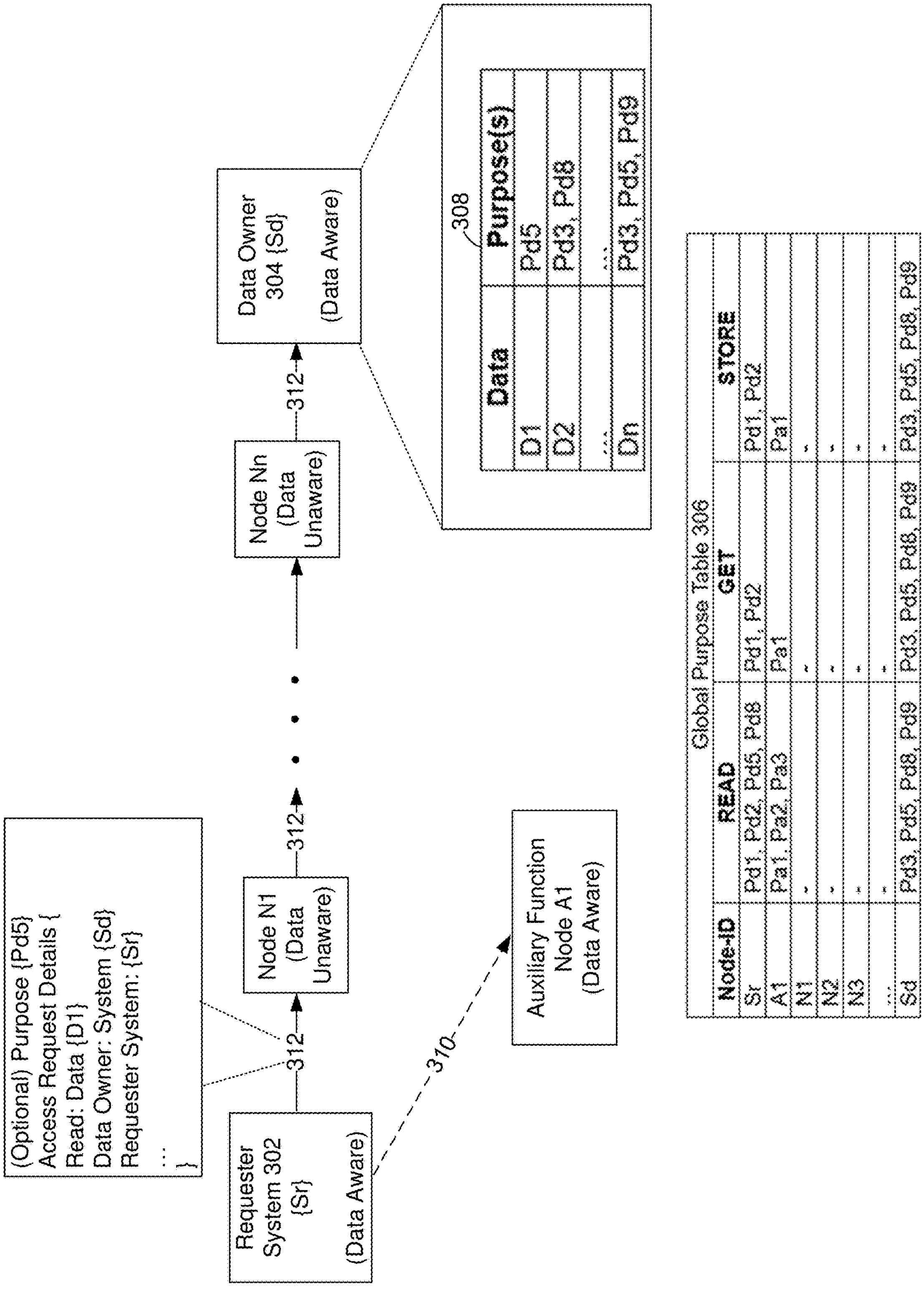
FIG. 3 shows an example data access request to only read a data element, in accordance with one or more embodiments of the present disclosure.

In one or more embodiments, block 116 depends on whether the purpose for the data access request 106 is specified in the data access request 106 or not. When the purpose is defined in the data access request 106, the data owner system 105 may verify via a global purpose table (e.g., as shown in FIG. 3) whether the requested purpose is a permitted purpose for the target node (e.g., depending on the type of request, which is a READ request in FIG. 1, and therefore the target node would be the requester system 102) for the given type of request (e.g., a READ request in FIG. 1), and then if the requested purpose matches a permitted purpose in the purpose table 112 for the requested data. When the purpose is not defined in the data access request 106, the data owner system 105 may determine whether the requested data has any permitted purposes in the purpose table 112, and then whether any of those permitted purposes may match a permitted purpose in the global purpose table for the target node for the given type of request. Additional example scenarios are shown and described in subsequent figures herein.

Figure 2:
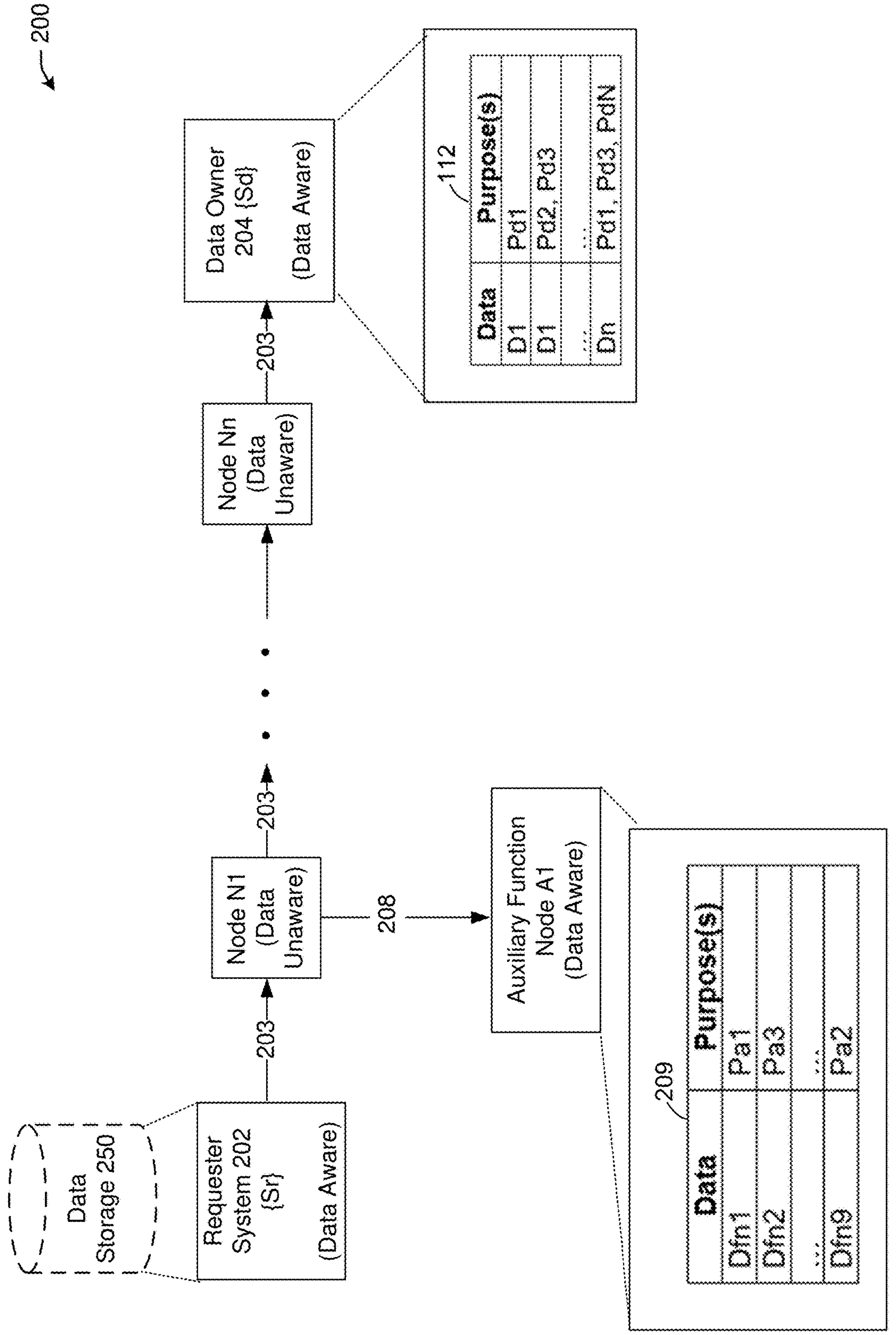
FIG. 2 shows example node types in a data access call path, in accordance with one or more embodiments of the present disclosure.

FIG. 2 shows example node types in a data access call path 200, in accordance with one or more embodiments of the present disclosure.

Referring to FIG. 2, a requester system 202 {$S_r$} may generate and send a request 203 to a data owner 204 {Sd}, and the request 203 may be propagated through one or more intermediate nodes (e.g., nodes N1-Nn). Any of the nodes may perform auxiliary requests for the request 203, such as through an auxiliary function node A1. The requester system 202, the data owner 204, and auxiliary function node A1 may be data aware nodes. For example, the requester system 202 may perform read/write/store operations on data. The auxiliary function node A1 may examine the contents of an auxiliary request 208 from the node N1 so that the auxiliary function node A1 may perform assigned auxiliary functions. For example, the auxiliary function node A1 may have access to a purpose table 209 defining permitted purposes for respective data.

Still referring to FIG. 2, after the auxiliary functions have been performed by the auxiliary function node A1, the node N1 may propagate the request 203 to one or more subsequent nodes (e.g., node Nn). Node Nn may be a passthrough (e.g., data unaware) node, which does not examine the contents of the request 203, and may propagate the request 203 to the data owner 204. The data owner 204 may be responsible for examining the content of the request 203 to perform assigned functions. For example, the data owner 204 may have access to the purpose table 112 of FIG. 1 or another purpose table, and may verify (e.g., block 116) that the purpose of the request 203 matches a permitted purpose of the data in the request 203.

In one or more embodiments, the data requester system 202 (node Sr) may include or otherwise have access to a data storage 250, which also may store data in the schema.

FIG. 3 shows an example data access request to only read a data element, in accordance with one or more embodiments of the present disclosure.

Referring to FIG. 3, a requester system 302 may send requests to a data owner 304 through one or more intermediate nodes (e.g., node N1-node Nn). A global purpose table 306 may define all permitted purposes for the respective nodes. The data owner 304 may have access to a purpose table 308 defining permitted purposes for respective data elements. The requester system 302 may need to perform an auxiliary purpose before it may forward its request to the data owner 304, so the requester system 302 optionally may send an auxiliary request 310 to an auxiliary function node A1, which may need to perform the auxiliary purpose. For example, the auxiliary purpose request 310 may include: purpose {Pa1} and access request details {read data {D1}, data owner: system 304 {Sd}, requester system 302 {Sr}}. After the auxiliary check is performed at the auxiliary function node A1, the requester system 302 may send a data access request 312 to the data owner 304 via the intermediate nodes.

Still referring to FIG. 3, the node N1 may receive the data access request 312, which optionally may include the purpose {Pd5} of the data access request 312. When the data access request 312 does not include the purpose, the data owner 304 may determine the purpose. The data access request 312 may include access request details {read: data {D1}, data owner: owner system 304 {Sd}, requester system: requester system 302 {Sr}}. The node N1 may be data unaware and may forward the data access request 312 to one or more subsequent nodes, such as node N1, which also may be data unaware and may forward the data access request 312 to the data owner 304.

Still referring to FIG. 3, the data owner 304 may perform blocks 114 and 116 of FIG. 1, including to verify that the purpose of the data access request 312 matches a permitted purpose for the data {D1}. Using the global purpose table 306, the data owner 304 may verify that the requester system 302 is permitted to perform purpose {Pd5} for a READ request.

When the data access request 312 does not include the purpose, the data owner 304 may retrieve the purposes allowed for the requester system 302 (e.g., from the global purpose table 306) using the request type, which is READ in this example. The global purpose table 306 indicates that purposes {Pd1, Pd2, Pd5, and Pd8} are permitted purposes for a READ request from the requester system 302. Because the purpose {Pd5} is among the permitted purposes for the data {D1} per the purpose table 308, the data access request 312 may be permitted.

Figure 4:
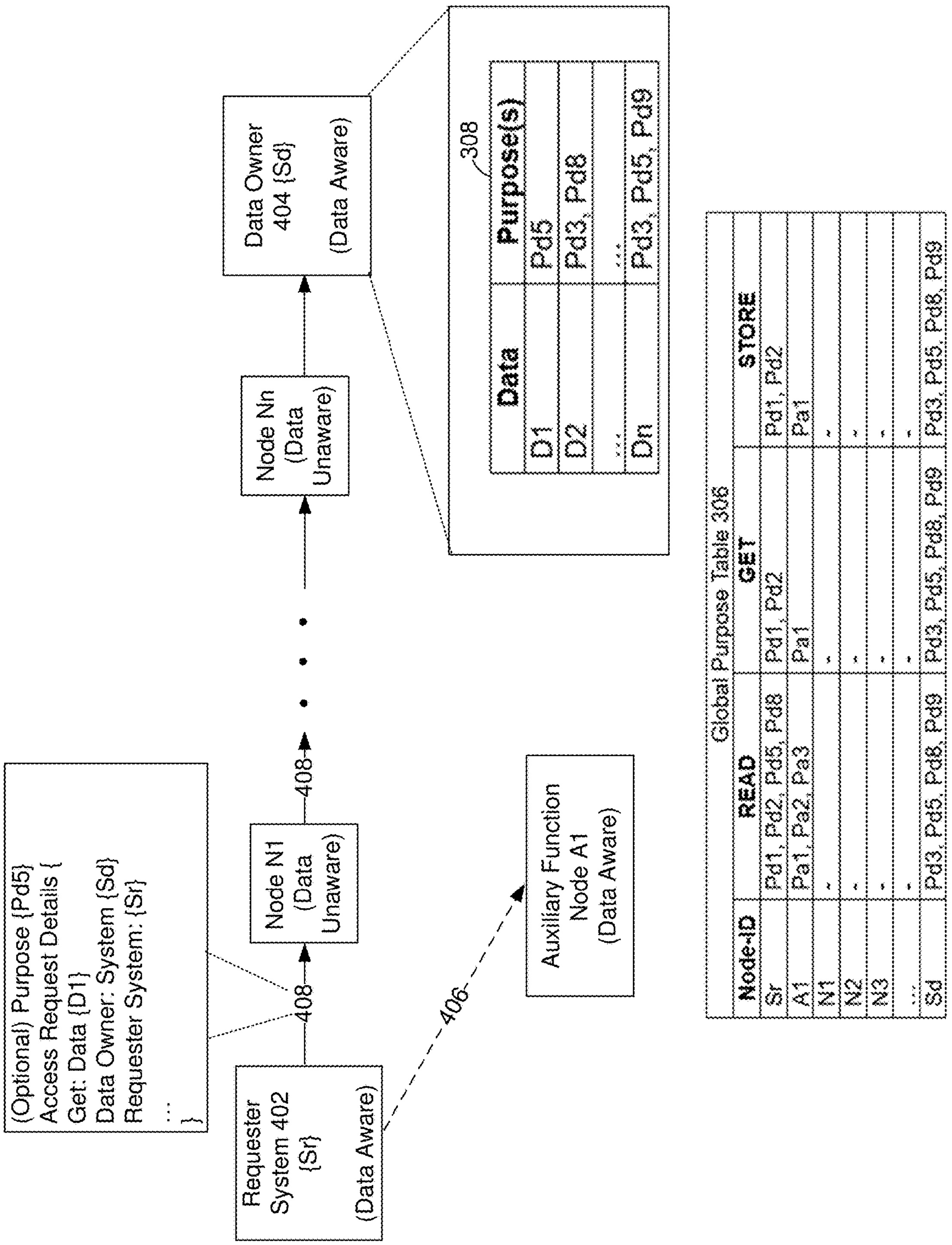
FIG. 4 shows an example data access request to get a data element, in accordance with one or more embodiments of the present disclosure.

FIG. 4 shows an example data access request to get a data element, in accordance with one or more embodiments of the present disclosure.

Referring to FIG. 4, a requester system 402 may send requests to a data owner 404 through one or more intermediate nodes (e.g., node N1-node Nn). The global purpose table 306 may define all permitted purposes for the respective nodes. The data owner 404 may have access to the purpose table 308 defining permitted purposes for respective data elements. The requester system 402 may need to perform an auxiliary purpose before it may forward its request to the data owner 404, so the requester system 402 optionally may send an auxiliary request 406 to an auxiliary function node A1, which may need to perform the auxiliary purpose. For example, the auxiliary purpose request 310 may include: purpose {Pa1} and access request details {get data {D1}, data owner: system 404 {Sd}, requester system 402 {Sr}}. After the auxiliary check is performed at the auxiliary function node A1, the requester system 402 may send a data access request 408 to the data owner 404 via the intermediate nodes.

Still referring to FIG. 4, the node N1 may receive the data access request 408, which optionally may include the purpose {Pd5} of the data access request 408. When the data access request 408 does not include the purpose, the data owner 404 may determine the purpose. The data access request 408 may include access request details {GET: data {D1}, data owner: owner system 404 {Sd}, requester system: requester system 402 {Sr}}. The node N1 may be data unaware and may forward the data access request 408 to one or more subsequent nodes, such as node N1, which also may be data unaware and may forward the data access request 408 to the data owner 404.

Still referring to FIG. 4, the data owner 404 may perform blocks 114 and 116 of FIG. 1, including to verify that the purpose of the data access request 408 matches a permitted purpose for the data {D1}. Using the global purpose table 306, the data owner 404 may verify that the requester system 402 is not permitted to perform purpose {Pd5} for a GET request, so the data access request 412 may be denied.

When the data access request 408 does not include the purpose, the data owner 404 may retrieve the purposes allowed for the requester system 402 (e.g., from the global purpose table 306) using the request type, which is GET in this example. The global purpose table 306 indicates that purposes {Pd1 and Pd2} are permitted purposes for a GET request from the requester system 402, but that purpose {Pd5} is the permitted purposes for the data {D1} (e.g., the permitted purpose for the requested data does not match the permitted purposes of the target node in a GET request). Therefore, the data access request 408 may be denied.

As a result of the denial, the data {D1} is not sent to the data owner 404 node or to any other nodes that have no purpose in receiving the request. The requester system 402 may be denied retrieval of the data {D1} because the requester system 402 does not have a permitted purpose for locally storing the data {D1}.

Figure 5:
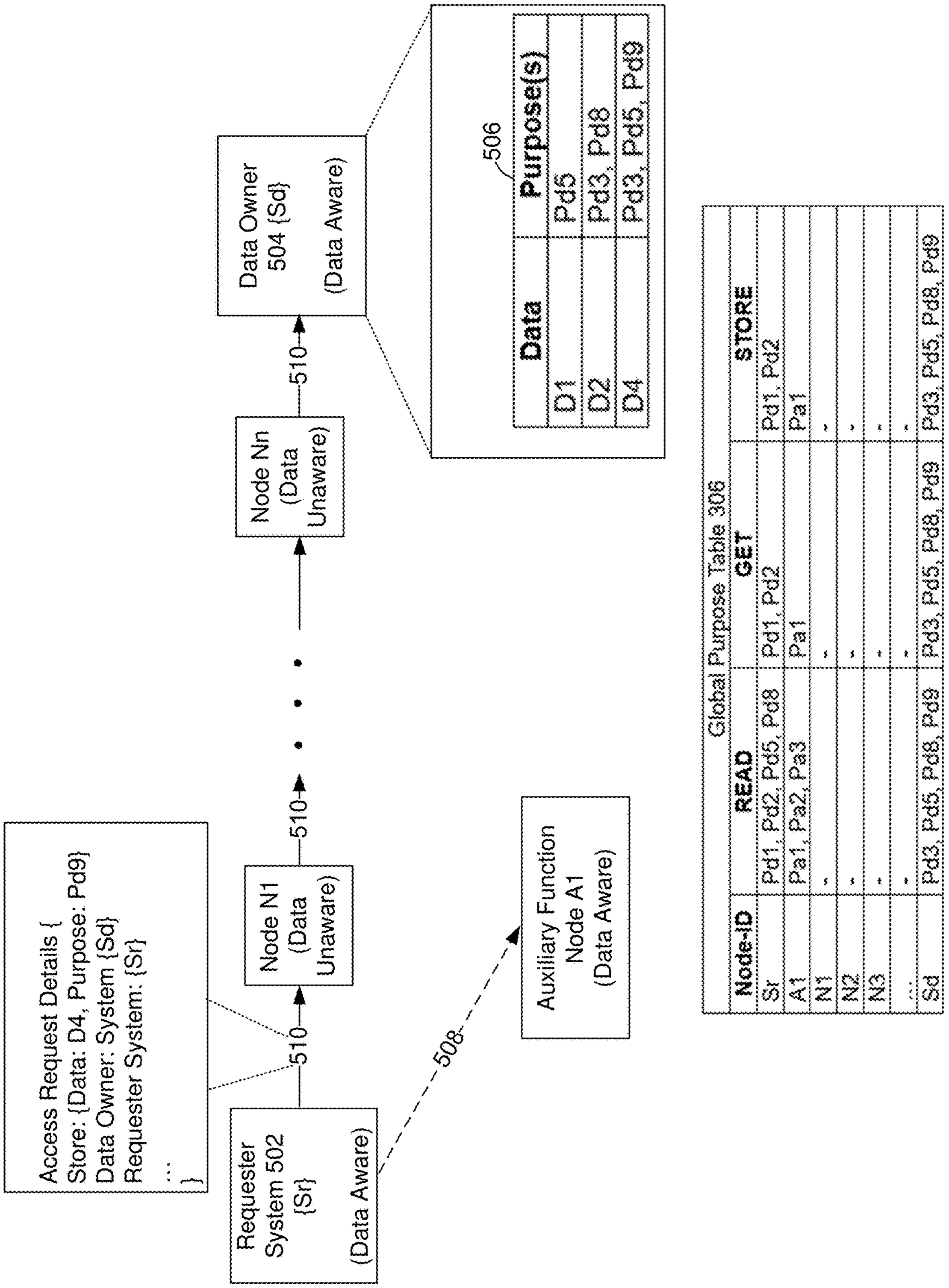
FIG. 5 shows an example data access request to store a data element (e.g., an existing data element in a schema), in accordance with one or more embodiments of the present disclosure.

FIG. 5 shows an example data access request to store a data element (e.g., an existing data element in a schema), in accordance with one or more embodiments of the present disclosure.

Referring to FIG. 5, a requester system 502 may send requests to a data owner 504 through one or more intermediate nodes (e.g., node N1-node Nn). The global purpose table 306 may define all permitted purposes for the respective nodes. The data owner 504 may have access to the purpose table 506 defining permitted purposes for respective data elements. The requester system 502 may need to perform an auxiliary purpose before it may forward its request to the data owner 504, so the requester system 502 optionally may send an auxiliary request 508 to an auxiliary function node A1, which may need to perform the auxiliary purpose. For example, the auxiliary purpose request 508 may include: purpose {Pa1} and access request details {store data {D4}, data owner: system 504 {Sd}, requester system 502 {Sr}}. After the auxiliary check is performed at the auxiliary function node A1, the requester system 502 may verify that it may send a STORE data access request 510 to the data owner 504 via the intermediate nodes. Because the data access request is a STORE request, the requester system 502 as the request sender may verify, using the global purpose table 306, that the target node—the data owner 504—is permitted to handle the requested data {D4} for the intended purpose {Pd9} before sending the data {D4} in the data access request 510.

Still referring to FIG. 5, the node N1 may receive the data access request 510, which optionally may include the purpose {Pd9} of the data access request 510. When the data access request 510 does not include the purpose, the data owner 504 may determine the purpose. The data access request 510 may include access request details {STORE: data {D4}, data owner: owner system 504 {Sd}, requester system: requester system 502 {Sr}}. The node N1 may be data unaware and may forward the data access request 510 to one or more subsequent nodes, such as node N1, which also may be data unaware and may forward the data access request 510 to the data owner 504.

Still referring to FIG. 5, the data owner 504 may perform blocks 114 and 116 of FIG. 1, including to verify that the purpose of the data access request 510 matches a permitted purpose for the data {D4}. Using the global purpose table 306, the data owner 504 may determine that the data owner 504 is permitted to perform purpose {Pd9} for a STORE request. Using the purpose table 506, the data owner 504 may determine that the purpose {Pd9} is permitted for the data {D4}, so the data access request 510 may be granted.

When the data access request 510 does not include the purpose, the data owner 504 may confirm whether the data {D4} is already in its storage, and retrieve the purposes allowed for the data owner 504 (e.g., from the global purpose table 306) using the request type, which is STORE in this example. The global purpose table 306 indicates that purposes {Pd3, Pd5, Pd8, and Pd9} are permitted purposes for a STORE request to the data owner 504, so the data access request 510 may be granted.

Figure 6:
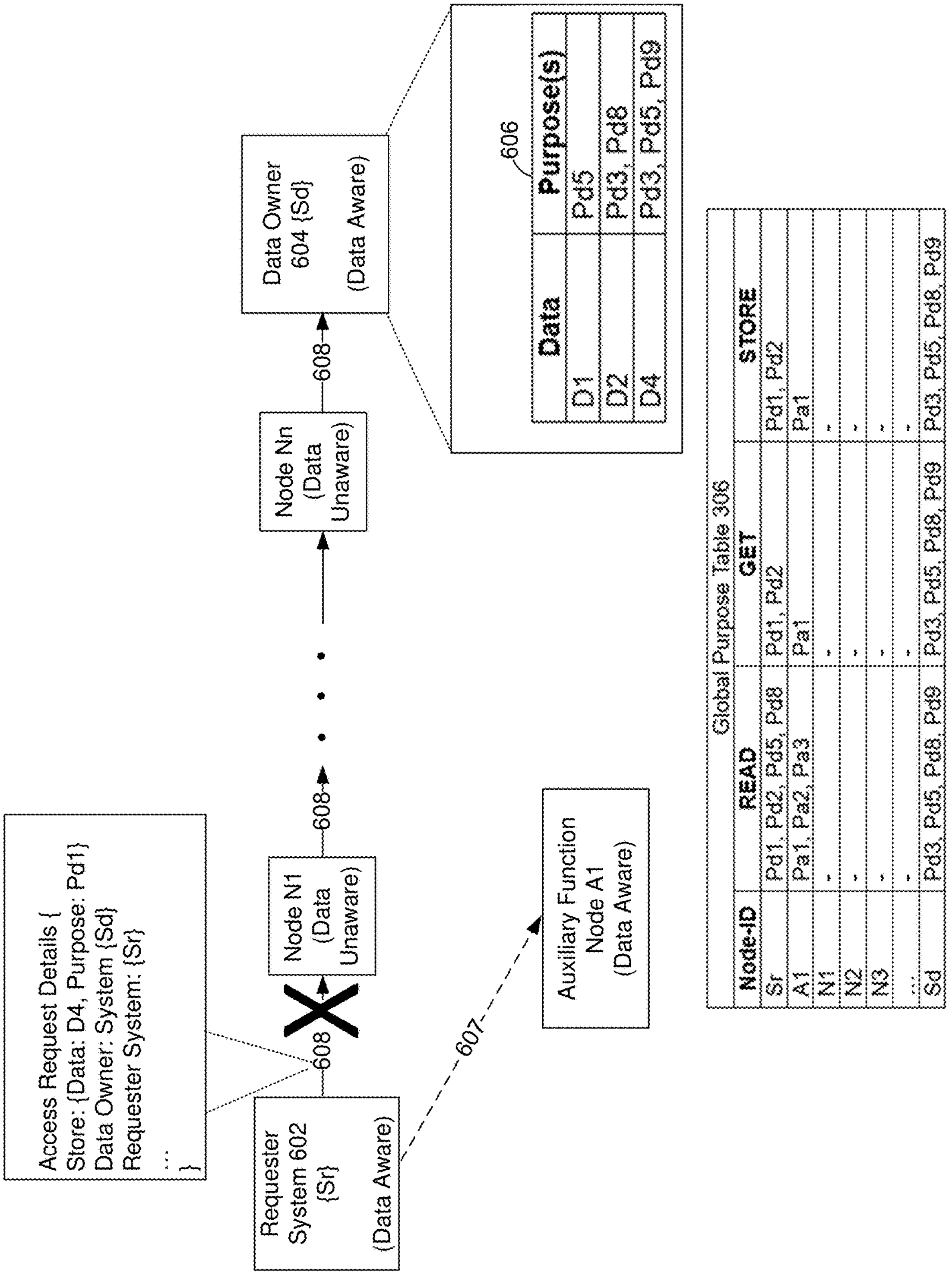
FIG. 6 shows an example denied data access request to store a data element, in accordance with one or more embodiments of the present disclosure.

FIG. 6 shows an example denied data access request to store a data element, in accordance with one or more embodiments of the present disclosure.

Referring to FIG. 6, a requester system 602 may send requests to a data owner 604 through one or more intermediate nodes (e.g., node N1-node Nn). The global purpose table 306 may define all permitted purposes for the respective nodes. The data owner 604 may have access to a purpose table 606 defining permitted purposes for respective data elements. The requester system 602 may need to perform an auxiliary purpose before it may forward its request to the data owner 604, so the requester system 602 optionally may send an auxiliary request 607 to an auxiliary function node A1, which may need to perform the auxiliary purpose. For example, the auxiliary purpose request 607 may include: purpose {Pa1} and access request details {store data {D4}, data owner: system 604 {Sd}, requester system 602 {Sr}}. After the auxiliary check is performed at the auxiliary function node A1, the requester system 602 may send a data access request 608 to the data owner 604 via the intermediate nodes.

Still referring to FIG. 6, the requester system 602 as the request sender may verify whether the STORE request data purpose {Pd1} of the data access request 608 is permitted to be stored on the target node, the data owner 604. The global table 306 indicates that the data owner 604 is permitted to STORE for purposes Pd3, Pd5, Pd8, and Pd9, but not for purpose Pd1. Therefore, the data access request 608 is denied. In this manner, the data sender node checks to verify whether the destination node is capable of handling the data for a specific purpose, and does not send the data to the target node if the answer is no.

Figure 7:
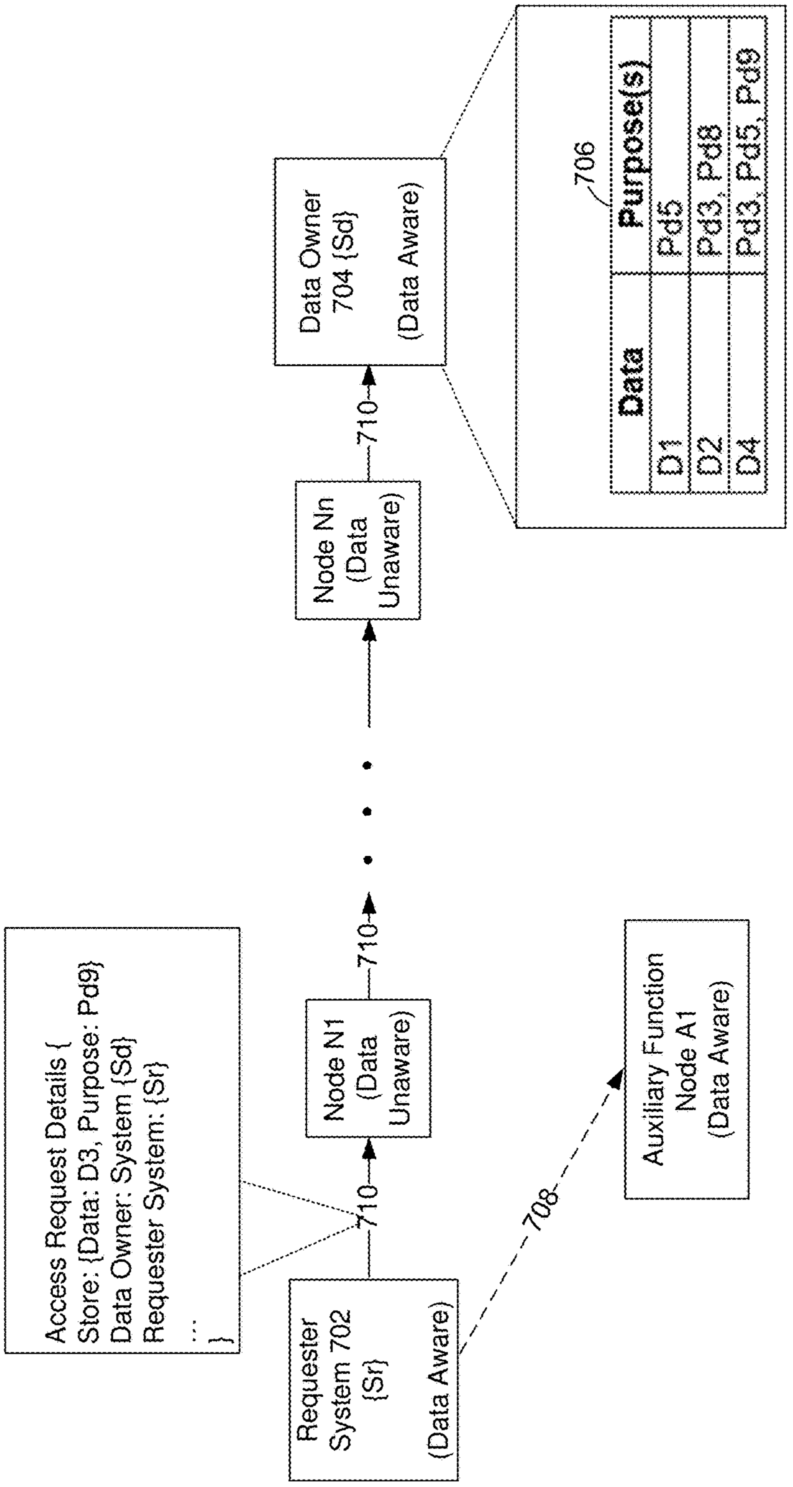
FIG. 7 shows an example data access request to store an unknown data element (e.g., not part of a storage schema), in accordance with one or more embodiments of the present disclosure.

FIG. 7 shows an example data access request to store an unknown data element (e.g., not part of a storage schema), in accordance with one or more embodiments of the present disclosure.

Referring to FIG. 7, a requester system 702 may send requests to a data owner 704 through one or more intermediate nodes (e.g., node N1-node Nn). The global purpose table 306 may define all permitted purposes for the respective nodes. The data owner 704 may have access to a purpose table 706 defining permitted purposes for respective data elements. The requester system 702 may need to perform an auxiliary purpose before it may forward its request to the data owner 704, so the requester system 702 optionally may send an auxiliary request 708 to an auxiliary function node A1, which may need to perform the auxiliary purpose. For example, the auxiliary purpose request 708 may include: purpose {Pa1} and access request details {store data {D3}, data owner: system 704 {Sd}, requester system 702 {Sr}}. After the auxiliary check is performed at the auxiliary function node A1, the requester system 702 may verify that it may send a STORE data access request 710 to the data owner 704 via the intermediate nodes. Because the data access request is a STORE request for an unknown data element, the requester system 702 as the request sender may verify, using the global purpose table 306, that the target node—the data owner 704—is permitted to handle the requested data {D3} for the intended purpose {Pd9} before sending the data {D3} in the data access request 710.

Still referring to FIG. 7, the node N1 may receive the data access request 710, which optionally may include the purpose {Pd9} of the data access request 710. When the data access request 710 does not include the purpose, the data owner 704 may determine the purpose. The data access request 710 may include access request details {STORE: data {D3}, data owner: owner system 704 {Sd}, requester system: requester system 702 {Sr}}. The node N1 may be data unaware and may forward the data access request 710 to one or more subsequent nodes, such as node N1, which also may be data unaware and may forward the data access request 710 to the data owner 704.

Still referring to FIG. 7, the data owner 704 may confirm whether the data {D3} is already in its storage, and may perform blocks 114 and 116 of FIG. 1, including to verify that the purpose of the data access request 710 matches a permitted purpose for the data {D3}. Using the global purpose table 306, the data owner 704 may determine that the data owner 704 is permitted to perform purpose {Pd9} for a STORE request, but the purpose table 706 indicates that the requested data {D3} is not in its storage schema (e.g., as indicated by the purpose table 706), so the data access request 710 is denied.

When the data access request 710 does not include the purpose, the data owner 704 determines whether the requested data {D3} is already in its storage schema, as indicated by the purpose table 706. When the answer is no, the data access request 710 is denied.

Figure 8:
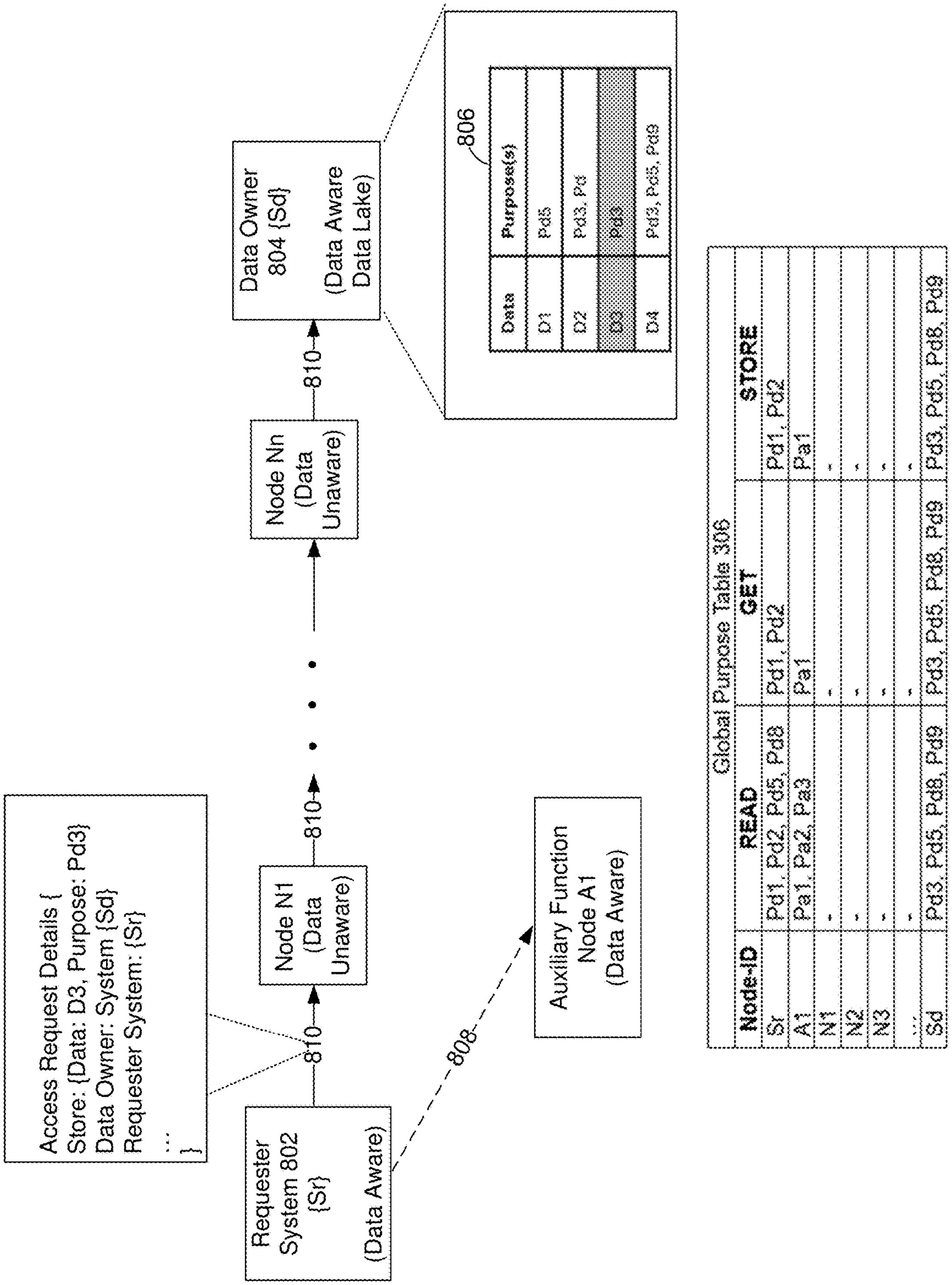
FIG. 8 shows an example data access request to store a data element in a data lake, in accordance with one or more embodiments of the present disclosure.

FIG. 8 shows an example data access request to store a data element in a data lake, in accordance with one or more embodiments of the present disclosure.

Referring to FIG. 8, a requester system 802 may send requests to a data owner 804 through one or more intermediate nodes (e.g., node N1-node Nn). In the example of FIG. 8, the data owner 804 may be a data lake that permits storage of new/unknown (e.g., not already in the schema) element types when their requested purpose matches permitted purposes of the data lake. The global purpose table 306 may define all permitted purposes for the respective nodes. The data owner 804 may have access to a purpose table 806 defining permitted purposes for respective data elements. The requester system 802 may need to perform an auxiliary purpose before it may forward its request to the data owner 804, so the requester system 802 optionally may send an auxiliary request 808 to an auxiliary function node A1, which may need to perform the auxiliary purpose. For example, the auxiliary purpose request 808 may include: purpose {Pa1} and access request details {store data {D3}, data owner: system 804 {Sd}, requester system 802 {Sr}}. After the auxiliary check is performed at the auxiliary function node A1, the requester system 802 may verify that it may send a STORE data access request 810 to the data owner 804 via the intermediate nodes.

Still referring to FIG. 8, the node N1 may receive the data access request 810, which optionally may include the purpose {Pd3} of the data access request 810. When the data access request 810 does not include the purpose, the data owner 804 may determine the purpose. The data access request 810 may include access request details {STORE: data {D3}, data owner: owner system 804 {Sd}, requester system: requester system 802 {Sr}}. The node N1 may be data unaware and may forward the data access request 810 to one or more subsequent nodes, such as node N1, which also may be data unaware and may forward the data access request 810 to the data owner 804.

Still referring to FIG. 8, the data owner 804 may perform blocks 114 and 116 of FIG. 1, including to verify that the purpose of the data access request 810 matches a permitted purpose for the data {D3}. Using the global purpose table 306, the data owner 804 may determine that the data owner 804 is permitted to perform purpose {Pd3} for a STORE request. The data owner 804 as a data lake does not need to verify whether the requested data {D3} is currently stored because the purpose {Pd3} is allowed for the STORE request, so the data access request 810 is permitted.

When the data access request 810 does not include the purpose, the data owner 804 may confirm whether the data {D3} is already in its storage. When the requested data {D3} is not currently stored at the data storage 804, then the data access request 810 would be denied. However, in the example of FIG. 8, the purpose table 806 shows that the purpose {Pd3} is permitted for the data {D3}, and the global purpose table 306 shows that the purpose {Pd3} matches a permitted STORE purpose for the data owner 804, so the data access request 810 is permitted.

Figure 9:
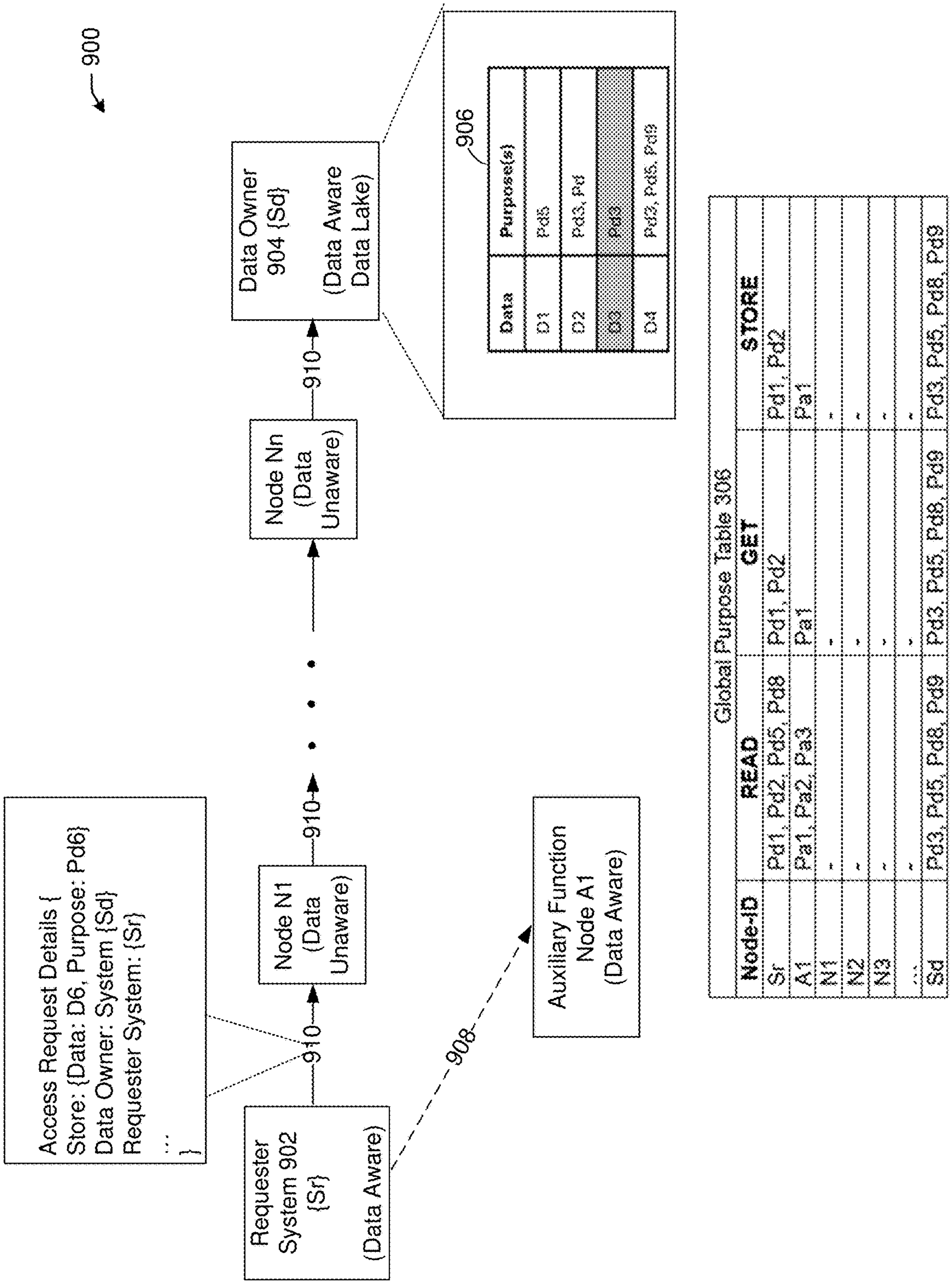
FIG. 9 shows an example denied data access request to store a data element in a data lake, in accordance with one or more embodiments of the present disclosure.

FIG. 9 shows an example denied data access request to store a data element in a data lake, in accordance with one or more embodiments of the present disclosure.

Referring to FIG. 9, a requester system 902 may send requests to a data owner 904 through one or more intermediate nodes (e.g., node N1-node Nn). In the example of FIG. 9, the data owner 904 may be a data lake that permits storage of new/unknown (e.g., not already in the schema) element types when their requested purpose matches permitted purposes of the data lake. The global purpose table 306 may define all permitted purposes for the respective nodes. The data owner 904 may have access to a purpose table 906 defining permitted purposes for respective data elements. The requester system 902 may need to perform an auxiliary purpose before it may forward its request to the data owner 904, so the requester system 902 optionally may send an auxiliary request 908 to an auxiliary function node A1, which may need to perform the auxiliary purpose. For example, the auxiliary purpose request 908 may include: purpose {Pa1} and access request details {store data {D6}, data owner: system 904 {Sd}, requester system 902 {Sr}}. After the auxiliary check is performed at the auxiliary function node A1, the requester system 902 may verify that it may send a STORE data access request 910 to the data owner 904 via the intermediate nodes. Because the data owner 904 is a data lake capable of handling data access requests for unknown data elements, the requester system 902 does not need to verify the permitted purposes of the data owner 904 for a STORE request.

Still referring to FIG. 9, the node N1 may receive the data access request 910, which optionally may include the purpose {Pd6} of the data access request 910. When the data access request 910 does not include the purpose, the data owner 904 may determine the purpose. The data access request 910 may include access request details {STORE: data {D6}, data owner: owner system 904 {Sd}, requester system: requester system 902 {Sr}}. The node N1 may be data unaware and may forward the data access request 910 to one or more subsequent nodes, such as node N1, which also may be data unaware and may forward the data access request 910 to the data owner 904.

Still referring to FIG. 9, the data owner 904 may perform blocks 114 and 116 of FIG. 1, including to verify that the purpose of the data access request 910 matches a permitted purpose for the data {D6}. Using the global purpose table 306, the data owner 904 may determine that the data owner 904 is not permitted to perform purpose {Pd6} for a STORE request, so the data access request 910 is denied.

When the data access request 910 does not include the purpose, the data owner 904 may confirm whether the data {D6} is already in its storage. When the requested data {D6} is not currently stored at the data storage 904, then the data owner 904 may not identify a permitted purpose that matches its permitted purposes in the global purpose table 306, so the data access request 910 is denied.

Referring to FIGS. 1-9, the data requester and any other nodes may include or otherwise have access to data storage where data in the schema may be stored. For example, the data requester node Sr may have a database that stores data (e.g., as shown in FIG. 2).

The examples herein are not meant to be limiting.

Figure 10:
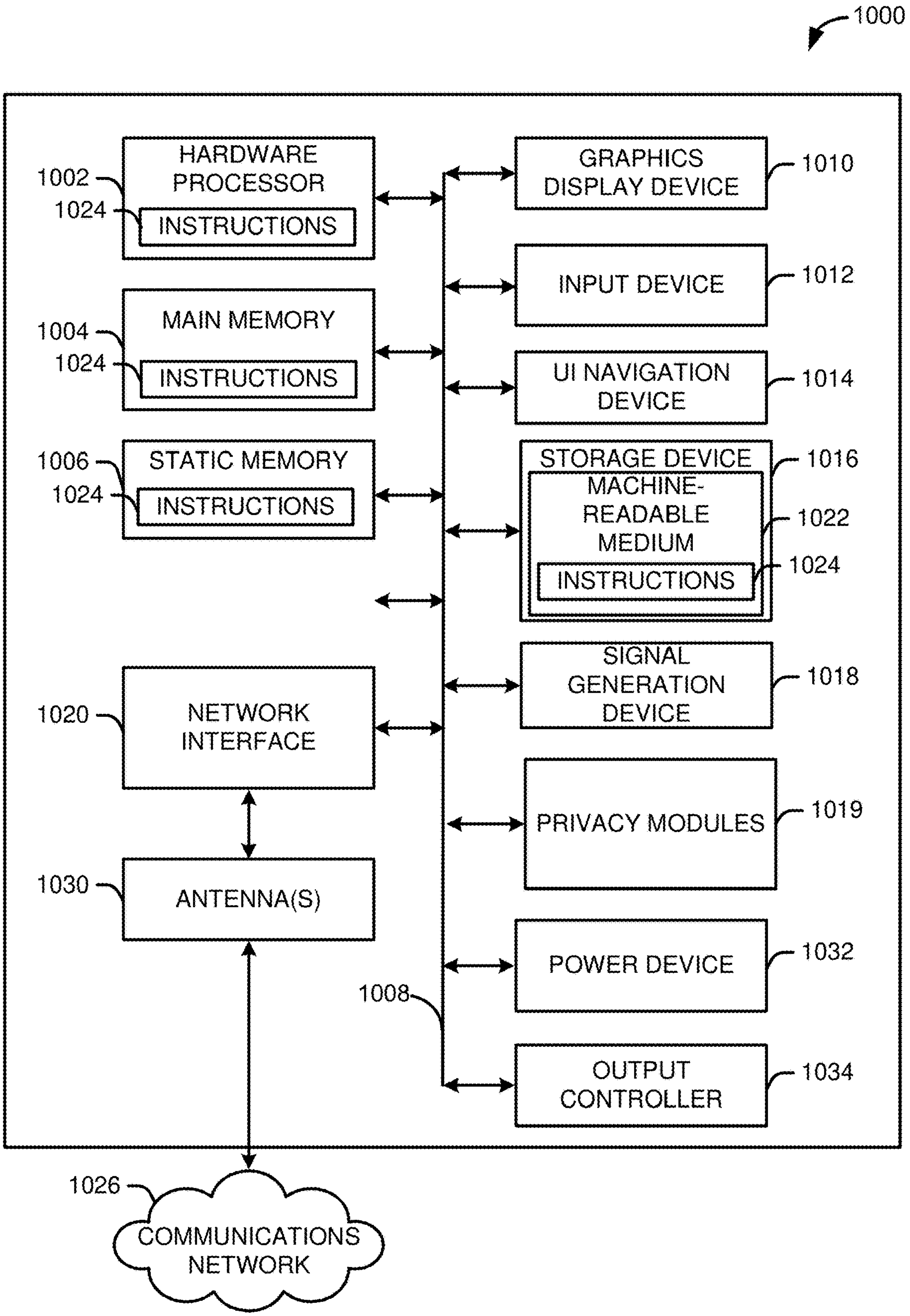
FIG. 10 illustrates a block diagram of an example machine upon which any of one or more techniques (e.g., methods) may be performed, in accordance with one or more example embodiments of the present disclosure.

FIG. 10 illustrates a block diagram of an example machine upon which any of one or more techniques (e.g., methods) may be performed, in accordance with one or more example embodiments of the present disclosure.

In other embodiments, the machine 1000 may operate as a standalone device or may be connected (e.g., networked) to other machines. In a networked deployment, the machine 1000 may operate in the capacity of a server machine, a client machine, or both in server-client network environments. The machine 1000 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 1000 (e.g., computer system) may include a hardware processor 1002 (e.g., a central processing unit (CPU), a graphics processing unit (GPU), a hardware processor core, a tensor processing unit (TPU), or any combination thereof), a main memory 1004 and a static memory 1006, some or all of which may communicate with each other via an interlink (e.g., bus 1008). The machine 1000 may further include a power device 1032, a graphics display device 1010, an input device 1012 (e.g., a keyboard), and a user interface UI navigation device 1014 (e.g., a mouse). In an example, the graphics display device 1010, input device 1012, and UI navigation device 1014 may be a touch screen display. The machine 1000 may additionally include a storage device 1016, a signal generation device 1018, one or more privacy modules 1019 (e.g., capable of performing the operations of the nodes in FIGS. 1-9, such as determining whether to send or not send data access requests, and/or whether or to permit the data access requests), and a network interface 1020 coupled to antenna(s) 1030. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 520 may include one or more physical jacks (e.g., Ethernet, coaxial, or phone jacks) or one or more antennas to connect to the communications network 1026. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to an object with a type, associated data, a set of methods that operate on it, and, if applicable, relationships to other resources. Additionally or alternatively, the term "compute resource" or "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and includes computing and/or network resources. System resources may be considered as a set of coherent functions, network data objects or services, accessible through a server where such system resources reside on a single host or multiple hosts and are clearly identifiable.

The term "cloud service provider" or "CSP" at least in some examples refers to an organization that operates or otherwise provides cloud resources including, for example, centralized, regional, and/or edge data centers and/or the like. In some examples, the term "cloud computing" refers to computing resources and services offered by a CSP.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

What is claimed is:

1. A method for enhancing data privacy in a distributed architecture using data purposes, the method comprising:

sending, by at least one processor of a requester system, to a data owner, a data access request for first data for a first purpose, wherein the data access request comprises an indication of the first data and an indication of the first purpose;

receiving, by at least one intermediate node between the requester system and the data owner, the data access request;

forwarding, by the at least one intermediate node, the data access request to the data owner;

accessing, by at least one processor of the data owner, a global purpose table defining permitted purposes for respective nodes and for respective types of data access requests, the respective types of data access requests comprising READ requests, GET requests, and STORE requests;

identifying, by the at least one processor of the data owner, the first purpose in the global purpose table as a permitted purpose for a target node of the data access request, wherein the target node is the requester system when the data access request is a READ request or a GET request, and wherein the target node is the data owner when the data access request is a STORE request;

accessing, by the at least one processor of the data owner, a purpose table defining permitted purposes for respective data elements;

identifying, by the at least one processor of the data owner, the first purpose in the purpose table as a permitted purpose for the first data; and permitting, by the at least one processor of the data owner, based on identifying the first purpose as a permitted purpose for the target node and for the first data, the data access request, wherein permitting the data access request comprises permitting the target node to access the first data.

2. The method of claim 1, further comprising:

sending, by the at least one processor of the requester system, to the data owner, a second data access request for second data for a second purpose, wherein the second data access request comprises an indication of the second data;

determining, by the at least one processor of the data owner, that the second purpose is not permitted for at least one of the second data or a target node for the second data; and denying, by the at least one processor of the data owner, the second data access request based on determining that the second purpose is not permitted for the at least one of the second data or the target node for the second data, wherein denying the second data access request comprises denying the target node for the second data access to the second data.

3. The method of claim 1, further comprising:

sending, by the at least one processor of the requester system, to the data owner, a second data access request for second data for a second purpose, wherein the second data access request comprises an indication of the second data, and wherein an indication of the second purpose is absent from the second data access request;

identifying, by the at least one processor of the data owner, one or more purposes permitted for the target node based on a type of the data access request, the type being a READ, GET, or STORE request;

permitting or denying the second data access request, by the at least one processor of the data owner, based on whether the one or more purposes permitted for the target node match a permitted purpose for the second data.

4. The method of claim 1, wherein the data access request is a STORE request to store the first data at the data owner, and wherein the first data is an existing data element at the data owner, the method further comprising:

identifying, by the at least one processor of the requester system, the first purpose in the global purpose table as a permitted purpose for the data owner, wherein sending the data access request to the data owner is based on determining that the first purpose is a permitted purpose for the data owner.

5. A method for enhancing data privacy in a distributed architecture using data purposes, the method comprising:

receiving, by at least one processor of a requester system, a data access request to a data owner for first data for a first purpose, wherein the data access request comprises an indication of the first data;

accessing, by at least one processor of the data owner or by the at least one processor of the requester system, a global purpose table defining permitted purposes for respective nodes and for respective types of data access requests;

accessing, by the at least one processor of the data owner, a purpose table defining permitted purposes for respective data elements; and permitting or denying, by the at least one processor of the data owner or of the requester system, the data access request based on whether the global purpose table indicates that the first purpose is a permitted purpose for a target node of the data access request and whether the first purpose is a permitted purpose for the first data in the purpose table, wherein the target node is the requester system or the data owner based on a type of the data access request.

6. The method of claim 5, wherein the type of the data access request is a read request, wherein an indication of the first purpose is included in the data access request, and wherein the permitting or the denying of the data access request comprises:

denying the data access request when the first purpose is not a permitted purpose in the global purpose table for the requester system for READ requests or when the first purpose is not a permitted purpose in a purpose table for the first data, or permitting the data access request when the first purpose is a permitted purpose in the global purpose table for the requester system for READ requests and when the first purpose is a permitted purpose in the purpose table for the first data.

7. The method of claim 5, wherein the type of the data access request is a read request, wherein an indication of the first purpose is absent from the data access request, and wherein the permitting or the denying of the data access request comprises:

denying the data access request when no permitted purposes for the requester system for read requests in the global purpose table match any permitted purposes for the first data in a purpose table, or permitting the data access request when one or more permitted purposes for the requester system for read requests in the global purpose table matches any permitted purposes for the first data in the purpose table.

8. The method of claim 5, wherein the type of the data access request is a GET request, wherein an indication of the first purpose is included in the data access request, and wherein the permitting or the denying of the data access request comprises:

denying the data access request when the first purpose is not a permitted purpose in the global purpose table for the requester system for GET requests or when the first purpose is not a permitted purpose in a purpose table for the first data, or permitting the data access request when the first purpose is a permitted purpose in the global purpose table for the requester system for GET requests and when the first purpose is a permitted purpose in the purpose table for the first data.

9. The method of claim 5, wherein the type of the data access request is a GET request, wherein an indication of the first purpose is absent from the data access request, and wherein the permitting or the denying of the data access request comprises:

denying the data access request when no permitted purposes for the requester system for GET requests in the global purpose table match any permitted purposes for the first data in a purpose table, or permitting the data access request when one or more permitted purposes for the requester system for GET requests in the global purpose table matches any permitted purposes for the first data in the purpose table.

10. The method of claim 5, wherein the type of the data access request is a STORE request, wherein the first data is an existing data element for the data owner, wherein an indication of the first purpose is included in the data access request, and wherein the permitting or the denying of the data access request comprises:

denying the data access request when the first purpose is not a permitted purpose in the global purpose table for the data owner for STORE requests or when the first purpose is not a permitted purpose for the first data in a purpose table, or permitting the data access request when the first purpose is a permitted purpose in the global purpose table for the data owner for STORE requests and when the first purpose is a permitted purpose for the first data in the purpose table.

11. The method of claim 5, wherein the type of the data access request is a STORE request, wherein the first data is an existing data element for the data owner, wherein an indication of the first purpose is absent from the data access request, and wherein the permitting or the denying of the data access request comprises:

denying the data access request when no permitted purposes for the data owner for STORE requests in the global purpose table match any permitted purposes for the first data in a purpose table, or permitting the data access request when one or more permitted purposes for the data owner for STORE requests in the global purpose table matches any permitted purposes for the first data in the purpose table.

12. The method of claim 5, wherein the type of the data access request is a STORE request, wherein the first data is not an existing data element for the data owner, wherein an indication of the first purpose is included in the data access request, and wherein the permitting or the denying of the data access request comprises:

denying the data access request when the first purpose is not included in the global purpose table as a permitted purpose for the data owner for STORE requests or based on the at least one processor of the data owner determining that the first data is not an existing data element for the data owner.

13. The method of claim 5, wherein the type of the data access request is a STORE request, wherein the first data is not an existing data element for the data owner, wherein an indication of the first purpose is absent from the data access request, and wherein the permitting or the denying of the data access request comprises:

denying the data access request based on the at least one processor of the data owner determining that the first data is not an existing data element for the data owner.

14. The method of claim 5, wherein the type of the data access request is a STORE request, wherein the first data is not an existing data element for the data owner, wherein the data owner is a data lake, wherein an indication of the first purpose is included in the data access request, and wherein the permitting or the denying of the data access request comprises:

denying the data access request when the first purpose is not included in the global purpose table as a permitted purpose for the data owner for STORE requests, or permitting the data access request when the first purpose is included in the global purpose table as a permitted purpose for the data owner for STORE requests.

15. The method of claim 5, wherein the type of the data access request is a STORE request, wherein the first data is not an existing data element for the data owner, wherein the data owner is a data lake, wherein an indication of the first purpose is absent from the data access request, and wherein the permitting or the denying of the data access request comprises:

denying the data access request when no permitted purposes for the first data are included in a purpose table match, or permitting the data access request when a permitted purpose for the first data is included in the global purpose table.

16. The method of claim 5, wherein the data access request is a STORE request to store the first data at the data owner, and wherein the first data is an existing data element at the data owner, the method further comprising:

identifying, by the at least one processor of the requester system, the first purpose in the global purpose table as a permitted purpose for the data owner, wherein sending the data access request to the data owner is based on determining that the first purpose is a permitted purpose for the data owner.

17. The method of claim 5, wherein the data access request is sent to the data owner via an intermediate node between the requester system and the data owner, the method further comprising:

sending, by at least one processor of the intermediate node, an auxiliary request to auxiliary function node, wherein sending the data access request to the data owner is conditional on the auxiliary function node performing an auxiliary function based on the auxiliary request.

18. A system for enhancing data privacy in a distributed architecture using data purposes, the system comprising:

at least one processor of a requester system; and at least one processor of a data owner, wherein:

the at least one processor of the requester system is configured to receive a data access request to a data owner for first data for a first purpose, wherein the data access request comprises an indication of the first data;

at least one of the at least one processor of the requester system or the at least one processor of the data owner is configured to access a global purpose table defining permitted purposes for respective nodes and for respective types of data access requests;

the at least one processor of the data owner is configured to access a purpose table defining permitted purposes for respective data elements; and at least one of the at least one processor of the requester system or the at least one processor of the data owner is configured to permit or deny the data access request based on whether the global purpose table indicates that the first purpose is a permitted purpose for a target node of the data access request and whether the first purpose is a permitted purpose for the first data in the purpose table, wherein the target node is the requester system or the data owner based on a type of the data access request.

19. The system of claim 18, wherein the first purpose is included in the data access request.

20. The system of claim 18, wherein the first purpose is absent from the data access request.

* * * * *